(12) United States Patent
Qiu

(10) Patent No.: US 11,617,346 B2
(45) Date of Patent: Apr. 4, 2023

(54) SMART FEEDER

(71) Applicant: JIANGSU ZHONGHENG PET ARTICLES JOINT-STOCK CO., LTD., Yancheng (CN)

(72) Inventor: Bin Qiu, Yancheng (CN)

(73) Assignee: JIANGSU ZHONGHENG PET ARTICLES JOINT-STOCK CO., LTD., Yancheng (CN)

( * ) Notice: Subject to any disclaimer, the term of this patent is extended or adjusted under 35 U.S.C. 154(b) by 172 days.

(21) Appl. No.: 17/194,330

(22) Filed: Mar. 8, 2021

(65) Prior Publication Data

US 2021/0315185 A1 Oct. 14, 2021

(30) Foreign Application Priority Data

| Apr. 8, 2020 | (CN) | 202020500253.6 |
| Aug. 27, 2020 | (CN) | 202021821796.4 |
| Dec. 2, 2020 | (CN) | 202011389757.6 |

(51) Int. Cl.
*A01K 5/02* (2006.01)

(52) U.S. Cl.
CPC .................. *A01K 5/0291* (2013.01)

(58) Field of Classification Search
CPC ...... A01K 5/02; A01K 5/0291; A01K 5/0208; A01K 5/0225; A01K 5/0258; A01K 5/0275; A01K 5/0283
See application file for complete search history.

(56) References Cited

U.S. PATENT DOCUMENTS

| 4,279,221 A * | 7/1981 | Arvizu | A01K 5/0291 |
| | | | 119/51.11 |
| 6,487,987 B1 * | 12/2002 | Choi | A01K 5/0291 |
| | | | 119/51.5 |
| 6,789,503 B1 * | 9/2004 | Gao | A01K 5/0291 |
| | | | 119/51.11 |
| 8,303,474 B2 * | 11/2012 | Iliev | A24D 3/0216 |
| | | | 493/47 |
| 8,905,272 B2 * | 12/2014 | Chan | G01F 11/20 |
| | | | 222/542 |
| 10,912,279 B2 * | 2/2021 | Chen | A01K 5/0275 |
| 11,224,202 B2 * | 1/2022 | Baxter | A01K 5/0291 |
| 2012/0048201 A1 * | 3/2012 | Qian | A01K 5/0291 |
| | | | 119/61.2 |

(Continued)

*Primary Examiner* — Ebony E Evans
(74) *Attorney, Agent, or Firm* — Bayramoglu Law Office LLC

(57) ABSTRACT

A smart feeder includes a food storage chamber and a rotating push plate mechanism. The food storage chamber conveys food to the rotating push plate mechanism through a conveying device, and the rotating push plate mechanism is configured to rotate and hit the food. The rotating push plate mechanism includes a rotating push plate, a first driving mechanism and a food passage. The food passage is in communication with an outlet of the food storage chamber, and the rotating push plate is rotatably installed inside the food passage. The first driving mechanism is configured to drive the rotating push plate to rotate. The food passage includes an outlet segment and a hitting cavity, and the outlet segment is tangent to the hitting cavity. The hitting cavity is in communication with the outlet of the food storage chamber. The rotating push plate is rotatably installed in the hitting cavity.

18 Claims, 5 Drawing Sheets

(56) References Cited

U.S. PATENT DOCUMENTS

| | | | |
|---|---|---|---|
| 2016/0029592 A1* | 2/2016 | Springer | G08C 17/02 |
| | | | 119/51.11 |
| 2018/0077897 A1* | 3/2018 | Christianson | A01K 5/02 |
| 2019/0335707 A1* | 11/2019 | Yan | A01K 5/0291 |
| 2020/0100460 A1* | 4/2020 | Chen | A01K 5/0225 |
| 2020/0316537 A1* | 10/2020 | Morin | B01F 27/11451 |
| 2022/0132799 A1* | 5/2022 | Wang | A01K 29/005 |
| | | | 119/57.91 |

* cited by examiner

SMART FEEDER

CROSS REFERENCE TO THE RELATED APPLICATIONS

This application is based upon and claims priority to Chinese Patent Applications No. 202020500253.6, filed on Apr. 8, 2020; No. 202021821796.4, filed on Aug. 27, 2020; and No. 202011389757.6, filed on Dec. 2, 2020; the entire contents of which are incorporated herein by reference.

TECHNICAL FIELD

The present invention relates to the field of pet appliances, in particular to a smart feeder.

BACKGROUND

Urbanization is on the rise. More and more people live in cities, but neighbors are unfamiliar with each other, and residents may experience loneliness. In order to relieve loneliness, people have turned to pets, and now treat pets as members of their families. Pets bring unlimited fun to people's lives. Cats and dogs are most common. Since dogs are lively and active, their owners must take them out to play every day. However, now people are very busy with work and study, and often do not have time to go out to walk their dogs. As a result, the dogs are at home and do not exercise, which is very harmful to their physical and mental health.

Various pet accompanying smart robots are now on the market. Specifically, a robot mostly includes a housing, a control device, a feeding device, an ejecting device and a linkage device. The control device controls the linkage device to control the ejecting device and the feeding device very conveniently. When users go out, the robots can interact with their pets remotely. Typical linkage devices in smart robots use variable speed motors and gears to push pistons for feeding, and some use variable speed motors to drive pull rods for feeding. These linkage devices cause structures of the pet accompanying smart robots to be awkwardly disposed, however, and the provisioning and delivery of pet food often is problematic. This is unacceptable for the pet's well being.

Dog teasers, which can be used to feed pets and eject toys, such as a ball, to tease the pets, are also available. Specifically, a dog teaser includes a feeding system and a dog teasing system. The feeding system and the dog teasing system are configured to feed food and eject the toys, such as a ball, respectively. The feeding system includes a food storage chamber, a food box connected to the food storage chamber, and a control mechanism configured to control the time and amount of delivered food in the food storage chamber. When the control mechanism opens a passage between the food storage chamber and the food box, the pet food naturally slips off from the food storage chamber, and when the pet food arrives in the food box, the pet can eat directly from the food box. The dog is often unwilling to exercise after it is full, so the dog teasing system for ejecting the toy such as the ball is not very attractive to it and cannot achieve a good dog teasing effect.

Current feeders on the market all employ ejection mechanisms, and the ejected distance and angle are fixed, which cannot fully stimulate the enthusiasm of pets, and cannot achieve a good dog teasing effect. In addition, the position and form of laser light emitted from currently available feeders are singular, which does little to stimulate the pet.

SUMMARY

With respect to the shortcomings in the prior art, the present invention provides a smart feeder, which rotates and hits food through a rotating push plate mechanism and a slewing device, and adjusts the rotational speed of the rotating push plate mechanism to change front and rear positions of the hit food, so as to fully stimulate the enthusiasm of pets.

The present invention realizes the above technical purpose through the following technical means.

A smart feeder includes a food storage chamber and a rotating push plate mechanism. The food storage chamber is configured to convey food to the rotating push plate mechanism through a conveying device, and the rotating push plate mechanism is configured to rotate and hit the food.

Further, the rotating push plate mechanism includes a rotating push plate, a first driving mechanism and a food passage. The food passage is in communication with an outlet of the food storage chamber, and the rotating push plate is rotatably installed inside the food passage. The first driving mechanism is configured to drive the rotating push plate to rotate.

Further, the food passage includes an outlet segment and a hitting cavity, and the outlet segment is tangent to the hitting cavity. The hitting cavity is in communication with the outlet of the food storage chamber. The rotating push plate is rotatably installed in the hitting cavity.

Further, the rotating push plate is made of an elastomeric material, and a gap between the rotating push plate and an inner wall of the food passage is not greater than 1 mm.

Further, the conveying device includes a driving gear, a driven gear, a conveying belt and a second driving mechanism. The driving gear is drivingly connected to the driven gear through the conveying belt. The second driving mechanism is configured to drive the driving gear to rotate. A plurality of pallets are disposed on the conveying belt to convey the food. The pallets are in an arc shape.

The smart feeder further includes a control module. The control module is configured to control the conveying device and the rotating push plate mechanism to start synchronously or start after a delay.

Further, a communication module is disposed in the control module, and is configured to enable the control module to communicate with a terminal apparatus.

The smart feeder further includes a rotating laser module. The rotating laser module is located on a housing, and is configured to generate one of a rotating beam and a rotating laser pattern or a combination thereof.

Further, the rotating laser module includes a fourth driving mechanism and a laser. The fourth driving mechanism is installed in the housing, and an output end of the fourth driving mechanism is connected to the laser. The laser is configured to generate one of a beam and a laser pattern or a combination thereof.

Further, at least one laser is eccentrically installed on a laser fixing support, and the laser fixing support is connected to the output end of the fourth driving mechanism.

Further, the rotating laser module is located inside the housing, and a light-transmitting plate is disposed on the surface of the housing. An output of the rotating laser module is aligned with the light-transmitting plate.

The smart feeder further includes a sterilization device. The sterilization device is installed in the food storage chamber and/or the rotating push plate mechanism, and is configured to sterilize the food.

The smart feeder further includes a slewing device. The food storage chamber and the rotating push plate mechanism are installed inside an upper housing, and the bottom of the upper housing is connected to a lower housing through the slewing device.

Further, an infrared sensor is installed in the food storage chamber, and is configured to detect whether there is a shortage of food in the food storage chamber.

The present invention has the following advantages.

1. The smart feeder of the present invention rotates and hits food through the rotating push plate mechanism, and adjusts the rotation speed of the rotating push plate mechanism to change front and rear positions of the hit food, so as to fully stimulate the enthusiasm of pets.

2. The smart feeder of the present invention enables the rotating push plate mechanism to rotate through the slewing device, so as to change an ejection angle of the hit food to fully stimulate the enthusiasm of pets.

3. According to the smart feeder of the present invention, a distance that the hit food falls off can be changed with respect to different pets according to the users' requirements by controlling the conveying device and the rotating push plate mechanism to start synchronously or start after a delay, so that the smart feeder is suitable for various pets.

4. According to the smart feeder of the present invention, the sterilization device is installed in the food storage chamber and/or the rotating push plate mechanism for food sterilization to prevent the pets from eating polluted food.

5. According to the smart feeder of the present invention, the rotating push plate is made of the elastomeric material, and the gap between the rotating push plate and the inner wall of the food passage is not greater than 1 mm, which can realize the rotation of the rotating push plate. In this way, more importantly, when the food and the rotating push plate are stuck, the rotating push plate can easily drive the food to rotate through the deformation of an elastomer while ensuring that the food is not smashed or made piece meal.

6. The smart feeder of the present invention generates a rotating laser beam or a rotating laser pattern through a rotating laser module, so that the enthusiasm of pets can be fully stimulated due to the dynamics of the laser beam. In addition, the rotating laser module and the slewing device are used in combination such that the laser beam can be made to revolve through the slewing device, and generate rotation through the rotating laser module at the same time.

Figure 1:
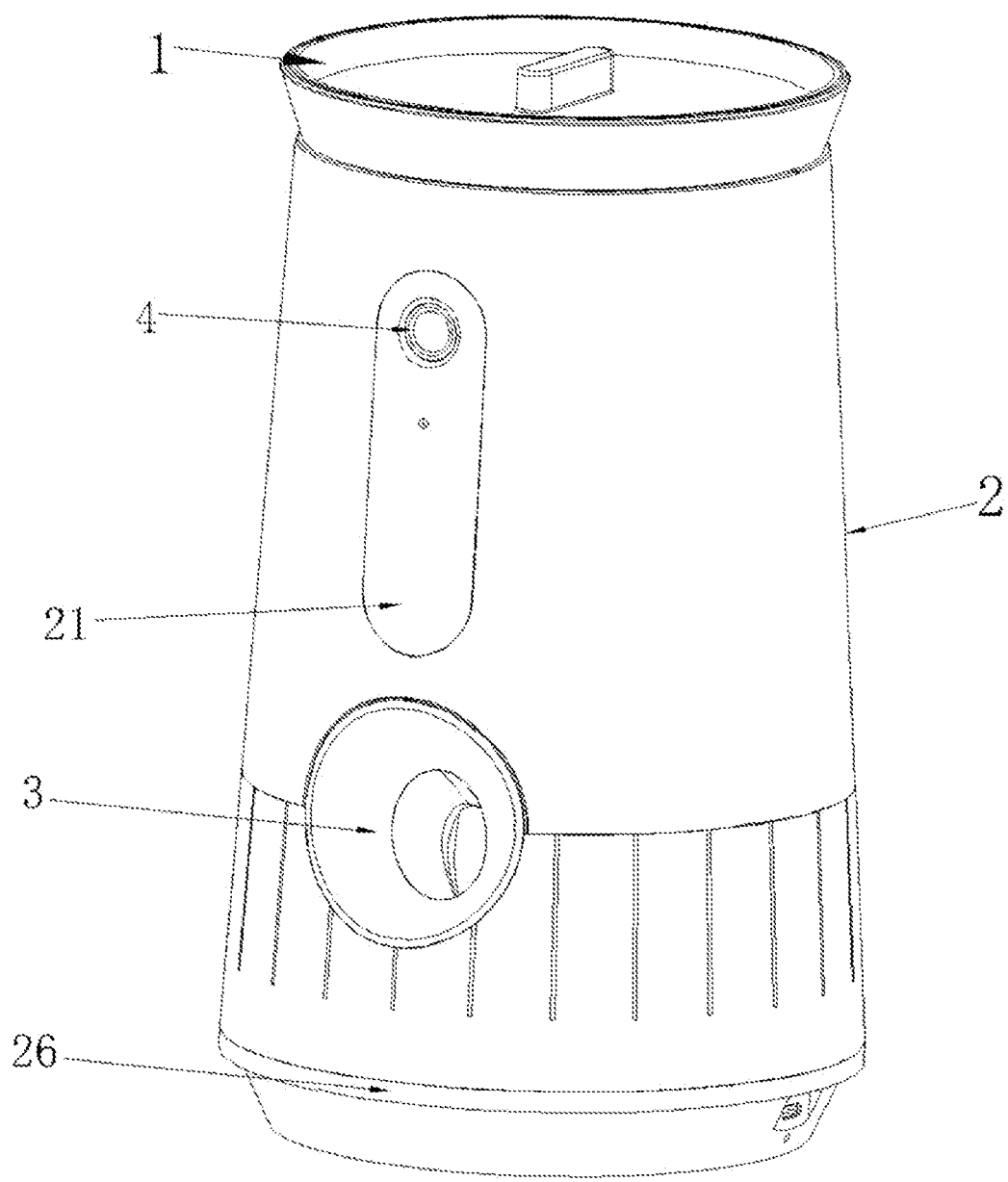
FIG. 1 is a diagram of an external shape of a smart feeder of the present invention.

1. upper cover; 2. upper housing; 3. food outlet; 4. camera; 5. food storage chamber; 6. infrared sensor; 7. conveying belt; 8. conveying device; 9. driven gear; 10. driving gear; 11. food passage; 12. rotating push plate; 13. slewing device; 14. lower housing; 15. sterilization device; 16. second driving mechanism; 17. first driving mechanism; 18. control module; 19. limiting switch; 20. pallet; 21. light-transmitting plate; 22. upper housing rotating and fixing member; 23. third driving mechanism; 24. pinion; 25. gear ring; 26. light guide belt; 27. fourth driving mechanism; 28. laser; 29. laser fixing support; and 30. support.

DETAILED DESCRIPTION OF THE EMBODIMENTS

The present invention will be further described below in conjunction with the drawings and specific embodiments, but the scope of protection of the present invention is not limited thereto.

Embodiments of the present invention will be described in detail below. Examples of the embodiments are shown in the drawings, wherein the same or similar reference signs throughout indicate the same or similar components or components having the same or similar functions. The embodiments described by referring to the drawings below are exemplary, and aim to explain the present invention, but cannot be understood to limit the scope of the invention.

In the description of the present invention, it needs to be understood that orientations or position relationships indicated by "center", "longitudinal", "lateral", "length", "width", "thickness", "upper", "lower", "axial", "radial", "vertical", "horizontal", "internal", "external" and other terms are orientations or position relationships shown based on the drawings, which are only for the convenience of describing the present invention and simplifying the description, and do not indicate or imply that the device or component must have specific orientations or be constructed and operated in a specific orientation, and thus cannot be understood to limit the invention. In addition, the terms "first" and "second" are only used to describe the purpose, but cannot be understood to indicate or imply relative importance or implicitly indicate the number of the indicated technical features. Thus, the features defined with "first" and "second" can explicitly or implicitly include one or more of the features. In the description of the present invention, "a plurality of" means two or more than two unless there is an explicit and specific definition additionally.

In the present invention, unless there are explicit provisions and definitions additionally, the terms "install", "link", "connect", "fix" and the like should be understood in a broad sense. For example, "connect" may be a fixed connection, a detachable connection, or an integral connection; it may be a mechanical connection, or an electrical connection; it may be a direct connection, an indirect connection through an intermediary, or an internal communication between two components. For those persons of ordinary skill in the art, the specific meanings of the above terms in the present invention may be understood according to specific situations.

Figure 2:
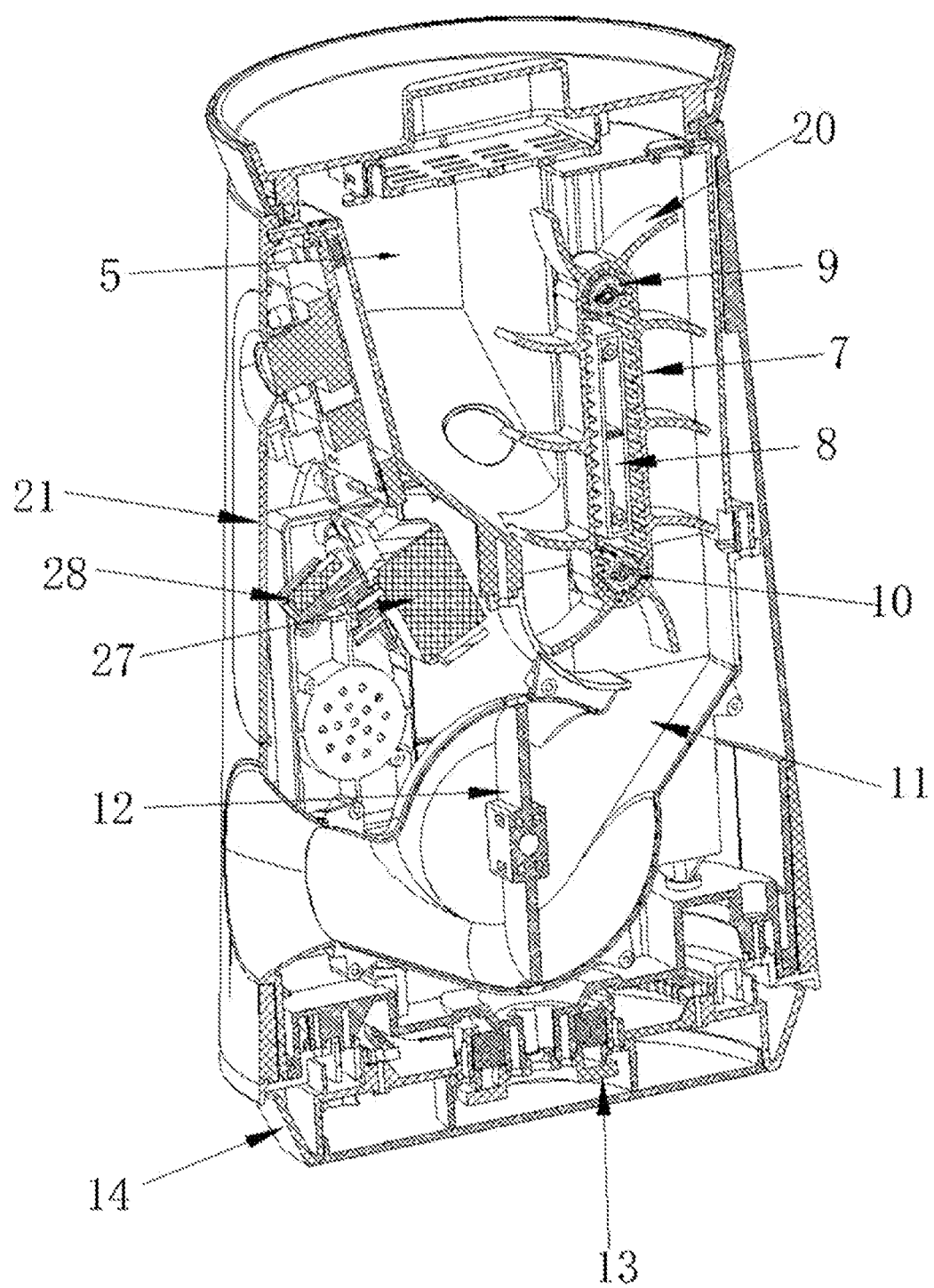
FIG. 2 is a diagram of an internal structure of the smart feeder of the present invention.

As shown in FIGS. 1 and 2, a pet feeder of the present invention includes a housing, the food storage chamber 5, a rotating push plate mechanism and the conveying device 8. The housing includes the upper housing 2 and the lower housing 14. The food storage chamber 5, the rotating push plate mechanism and the conveying device 8 are located inside the upper housing 2. The bottom of the upper housing 2 is connected to the lower housing 14 through the slewing device 13 to enable the upper housing 2 to rotate relative to the lower housing 14. The food storage chamber 5 is located at the upper portion of the upper housing 2, and the upper cover 1 is hermetically installed on the upper housing 2. The food storage chamber 5 can be supplemented with food by opening the upper cover 1. A desiccant is installed on the upper cover 1 to dry the food in the food storage chamber 5. The infrared sensor 6 is disposed inside the food storage chamber 5 to detect whether the food storage chamber 5 is low or empty. The camera 4 and a microphone are disposed on the upper housing 2. The camera 4 is configured to photograph the pet, and the microphone is configured to call the pet. The conveying device 8 is disposed inside the food storage chamber 5, and the conveying device 8 is vertically arranged at an outlet of the food storage chamber 5. The conveying device 8 includes the driving gear 10, the driven gear 9 and the conveying belt 7. The driving gear 10 is drivingly connected to the driven gear 9 through the conveying belt 7, and the driving gear 10 is drivingly connected to the second driving mechanism 16. A plurality of pallets 20 are disposed on the conveying belt 7, and the pallets 20 are configured to convey the food in the food storage chamber 5 to an inlet of an ejection device. The second driving mechanism 16 is a decelerating motor. The pallets 20 are in an arc shape to prevent the food from slipping off the pallets 20.

Figure 3:
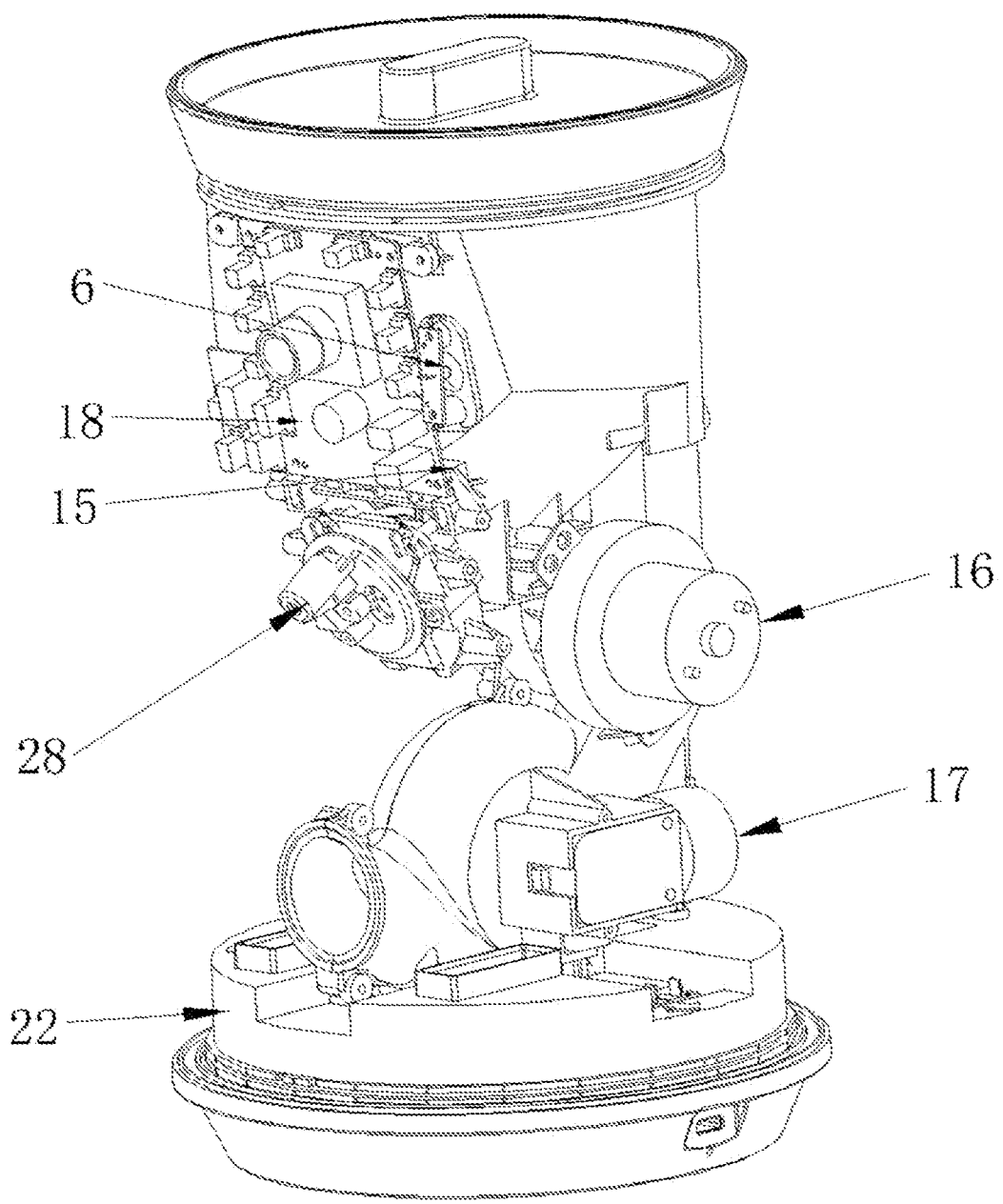
FIG. 3 is a diagram of installation positions of driving mechanisms of the present invention.

As shown in FIGS. 2 and 3, the rotating push plate mechanism includes the rotating push plate 12, the first driving mechanism 17 and the food passage 11. The food passage 11 is in communication with the outlet of the food storage chamber 5, and the rotating push plate 12 is rotatably installed inside the food passage 11. The first driving mechanism 17 is configured to drive the rotating push plate 12 to rotate. The food passage 11 includes an outlet segment and a hitting cavity, and the outlet segment is tangent to the hitting cavity. The hitting cavity is in communication with the outlet of the food storage chamber 5. The rotating push plate 12 is rotatably installed in the hitting cavity. The conveying device 8 conveys the food into the hitting cavity of the food passage 11. The first driving mechanism 17 drives the rotating push plate 12 to hit the food to cause the food to be ejected tangentially outward relative to the rotating push plate. An end of the outlet segment is the food outlet 3, and the food outlet 3 is located on the surface of the upper housing 2. The first driving mechanism 17 is a decelerating motor.

The rotating push plate 12 is made of an elastomeric material, and generally the elastomeric material may be silica gel, polytetrafluoroethylene, polyurethane or other organic materials. In an embodiment, in consideration of food safety, the rotating push plate 12 is preferably made of the silica gel or the polytetrafluoroethylene. A rotation speed of the rotating push plate 12 can be adjusted. The rotation speed output by the first driving mechanism 17 can be changed by frequency conversion, so that the hitting force of the rotating push plate 12 can be finally changed to change a movement distance of the food after being hit. A gap between the rotating push plate 12 and the inner wall of the food passage 11 is not greater than 1 mm, which can realize the rotation of the rotating push plate 12. In this way, more importantly, since the surface of the food is irregular, when the food and the rotating push plate 12 are stuck, the rotating push plate 12 can easily drive the food to rotate through the deformation of an elastomer while ensuring that the food is not smashed or made piece meal.

In order to realize the variety of the movement distance of the food after being hit, the present invention further includes the control module 18, and the control module 18 is configured to control the second driving mechanism 16 of the conveying device 8 and the first driving mechanism 17 of the rotating push plate mechanism to start synchronously or start after a delay. If the movement distance of the food after being hit is required to be relatively small, the second driving mechanism 16 is first started to enable the food to enter the hitting cavity through the conveying device 8, and the first driving mechanism 17 is then started after a delay. In this case, since the elapsed time of the rotating push plate 12 from starting to rotate to hitting the food is limited, the hitting force of the rotating push plate 12 is relatively small, and an initial speed obtained by the hit food is relatively small. This is because the start of the first driving mechanism 17 needs a time, and in order to wait the arriving of the food to then perform hitting, only a relatively small initial speed can be obtained. If the movement distance of the food after being hit is required to be relatively large, the second driving mechanism 16 and the first driving mechanism 17 are started simultaneously, and the speed of the second driving mechanism 16 is controlled, so that when the food enters the hitting cavity through the conveying device 8, the rotation speed of the first driving mechanism 17 already reaches a set rotation speed. In this case, the food is hit by the rotating push plate 12 to obtain a relatively large initial speed, so as to move a long distance. In order to ensure that the conveying device 8 conveys the food of one pallet 20 into the hitting cavity, the limiting switch 19 is installed adjacent to the conveying device 8. The second driving mechanism 16 is a decelerating motor.

A communication module is disposed in the control module 18, and is configured to enable the control module 18 to communicate with a terminal apparatus. The terminal apparatus may be a smart mobile phone, a smart computer or other smart apparatuses. The communication module is generally a Wireless Fidelity (WIFI) module, and the terminal apparatus can issue instructions to operate the control module 18.

Figure 5:
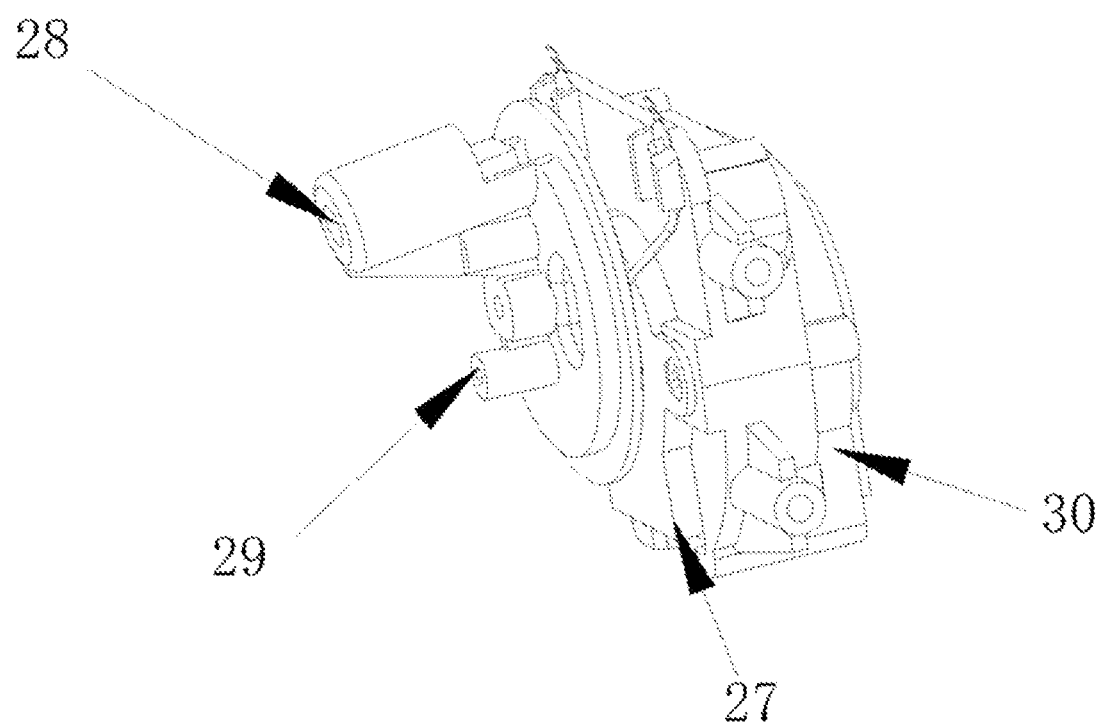
FIG. 5 is a diagram of the structure of a rotating laser module of the present invention.

As shown in FIG. 5, in order to enable the laser beam to dynamically and better stimulate the enthusiasm of pets, the present invention further includes a rotating laser module. The rotating laser module is located on the upper housing 2, and is configured to generate one of a rotating beam and a rotating laser pattern or a combination thereof. The rotating laser module includes the fourth driving mechanism 27 and the laser 28. The fourth driving mechanism 27 is installed in the upper housing 2 through the support 30, and an output end of the fourth driving mechanism 27 is connected to the laser 28. The laser 28 is configured to generate one of a beam and a laser pattern or a combination thereof. The laser 28 can be installed at a center of the output end of the fourth driving mechanism 27, and an outlet of the laser 28 is at a certain angle with the center of the output end of the fourth driving mechanism 27. The laser 28 is driven by the fourth driving mechanism 27 to generate a slewing beam or a slewing laser pattern or a combination thereof. The fourth driving mechanism 27 is a decelerating motor. In addition, in order to facilitate the wiring and conduction of the laser 28, a conductive slip ring is commonly used in the art. The principle of the conductive slip ring is as follows: the conductive slip ring includes a fixing part and a slewing ring. The fixing part may be installed on the support 30 and is connected to an external power source, and the slewing ring synchronously rotates with the laser 28 and is conductively connected to the laser 28. The slewing ring is rotatably connected to the fixing part, and always keeps conduction with the fixing part during the rotation of the slewing ring.

In order to enable the rotating laser module to generate laser beams or laser patterns or combinations thereof that have various colors, as shown in FIG. 5, at least one laser 28 is eccentrically installed on the laser fixing support 29. The eccentricity here refers to deviating from a slewing center. The laser fixing support 29 is connected to an output end of the fourth driving mechanism 27. For example, the output end of the fourth driving mechanism 27 is drivingly coaxially connected to the center of the laser fixing support 29. The laser fixing support 29 may be shaped as a strip. Two lasers 28 which generate laser beams with different colors are installed at two ends of the laser fixing support 29, that is, the two lasers 28 are eccentrically installed on the laser fixing support 29. Alternatively, the laser 28 of generating the laser beam and the laser 28 of generating the laser pattern are installed at two ends of the laser fixing support 29, respectively. As another example, the laser fixing support 29 is in a symmetrical cross structure formed by two strips, and four lasers 28 can be eccentrically installed on the laser fixing support 29. A structure of the laser fixing support 29 only needs to satisfy requirements of function and installation. For overall product aesthetics, the light-transmitting plate 21 is installed on the surface of the upper housing 2, and the laser beam or the laser pattern or the combination thereof output by the laser 28 is emitted through the light-transmitting plate 21. The light-transmitting plate 21 is generally a dark light-transmitting plate.

As shown in FIG. 3, the present invention further includes the sterilization device 15, and the sterilization device 15 is installed in the food storage chamber 5 and/or the food passage 11, and is configured to sterilize the food. The sterilization device 15 is an ultraviolet sterilization device or an ozone sterilization device. The sterilization device 15 may only be installed in the food storage chamber 5 for sterilizing the food in the food storage chamber 5. Alternatively, the sterilization device 15 may only be installed in the food passage 11 for sterilizing the food in the food passage 11. The sterilization device 15 may be simultaneously installed in the food storage chamber 5 and the food passage 11.

Figure 4:
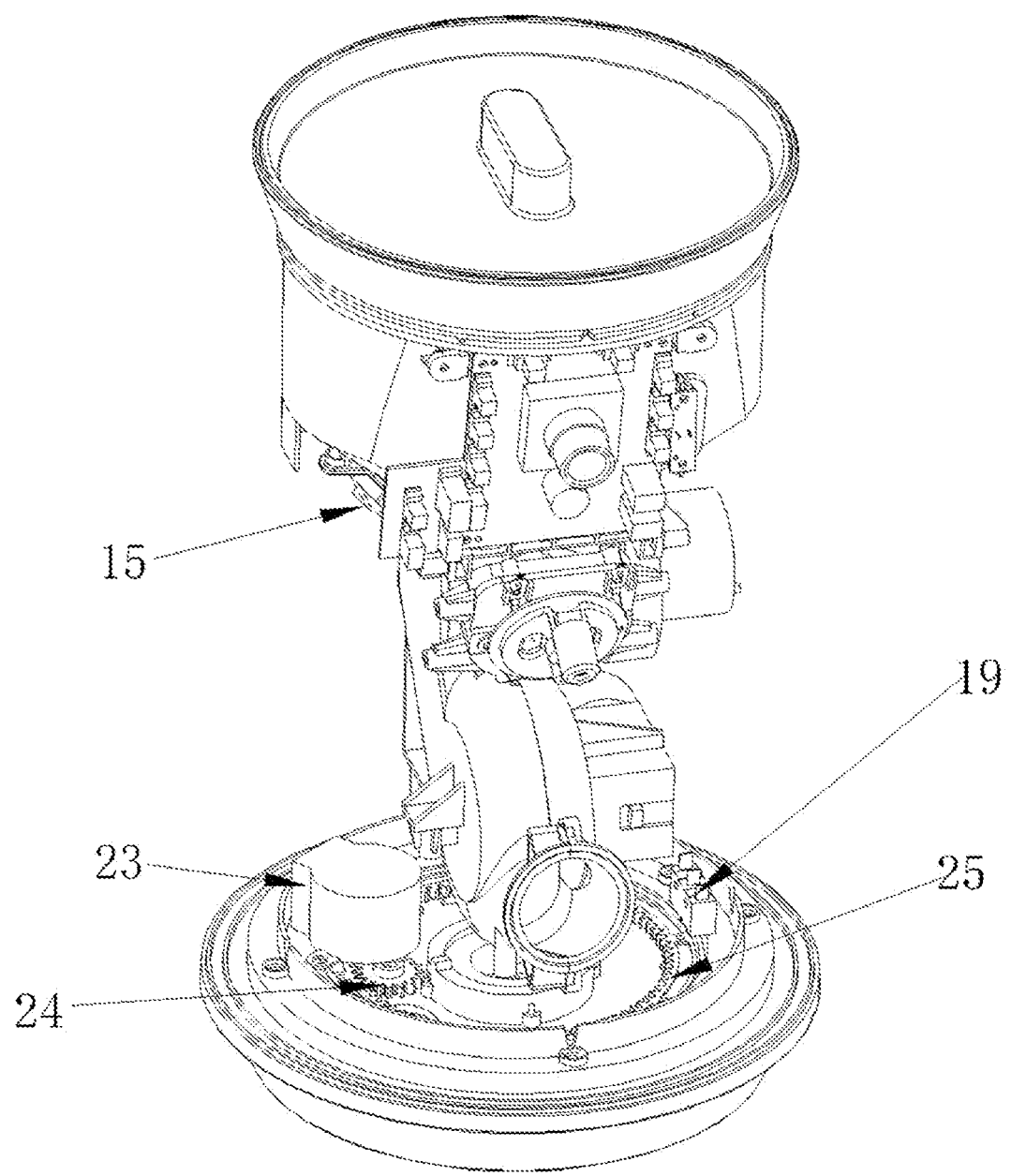
FIG. 4 is a diagram of the structure of a slewing device of the present invention.

In order to change the ejection angle of the hit food to fully stimulate the enthusiasm of pets, as shown in FIGS. 2, 3 and 4, the present invention further includes the slewing device 13. The food storage chamber 5, the conveying device 8 and the rotating push plate mechanism are directly or indirectly installed on the upper housing rotating and fixing member 22. The upper housing rotating and fixing member 22 is connected to the lower housing 14 through the slewing device 13. The slewing device 13 at least includes the third driving mechanism 23, the pinion 24 and the gear ring 25. The gear ring 25 is installed inside the lower housing 14. The pinion 24 is inner-engaged with the gear ring 25, and the pinion 24 is installed at an output end of the third driving mechanism 23. The third driving mechanism 23 is installed on the upper housing rotating and fixing member 22. The slewing device 13 and the rotating push plate mechanism can jointly effect a change in the ejection angle of the hit food and enhance the interest of pets. The slewing device 13 belongs the prior art and thus are not described again here. Since the rotating laser module is installed on the upper housing 2, and the laser light is emitted during the rotation of the slewing device 13, the laser beam can be made to revolve through the slewing device, and generate rotation through the rotating laser module at the same time. This optimally enhances the interest of pets. The light guide belt 26 is disposed on the outer surface of the lower housing 14, which can attract the attention of pets and can also serve as a night light.

It should be understood that although the present description is described according to respective embodiments, each embodiment does not only include one independent technical solution. Such a narration manner of the description is only for clarity, and those skilled in the art should regard the specification as a whole. The technical solutions in the respective embodiments can also be combined properly to form other embodiments that can be understood by those skilled in the art.

The above detailed description is only meant to be exemplary with respect to the available embodiments of the present invention, and is not used to limit the scope of protection of the present invention. All equivalent embodiments or modifications made without departing from the technical spirit of the present invention shall fall within in the scope of protection of the present invention.

What is claimed is:

1. A smart feeder, comprising a food storage chamber and a rotating push plate mechanism; wherein the food storage chamber is configured to convey a food to the rotating push plate mechanism through a conveying device, and the rotating push plate mechanism is configured to rotate and hit the food, wherein the conveying device comprises a driving gear, a driven gear, a conveying belt and a first driving mechanism; the driving gear is drivingly connected to the driven gear through the conveying belt the first driving mechanism is configured to drive the driving gear to rotate; a plurality of pallets are disposed on the conveying belt to convey the food; and the plurality of pallets are in an arc shape.

2. The smart feeder of claim 1, wherein the rotating push plate mechanism comprises a rotating push plate, a second driving mechanism and a food passage; the food passage is in communication with an outlet of the food storage chamber, and the rotating push plate is rotatably installed inside the food passage; and the second driving mechanism is configured to drive the rotating push plate to rotate.

3. The smart feeder of claim 2, wherein the food passage comprises an outlet segment and a hitting cavity, and the outlet segment is tangent to the hitting cavity; the hitting cavity is in communication with the outlet of the food storage chamber; and the rotating push plate is rotatably installed in the hitting cavity.

4. The smart feeder of claim 3, further comprising a sterilization device, wherein the sterilization device is installed in at least one of the food storage chamber or the rotating push plate mechanism; and the sterilization device is configured to sterilize the food.

5. The smart feeder of claim 2, wherein the rotating push plate is made of an elastomeric material, and a gap between the rotating push plate and an inner wall of the food passage is smaller than or equal to 1 mm.

6. The smart feeder of claim 5, further comprising a sterilization device, wherein the sterilization device is installed in at least one of the food storage chamber or the rotating push plate mechanism; and the sterilization device is configured to sterilize the food.

7. The smart feeder of claim 2, further comprising a sterilization device, wherein the sterilization device is installed in at least one of the food storage chamber or the rotating push plate mechanism; and the sterilization device is configured to sterilize the food.

8. The smart feeder of claim 1, further comprising a control module, wherein the control module is configured to control the conveying device and the rotating push plate mechanism to start synchronously or start after a delay.

9. The smart feeder of claim 8, wherein a communication module is disposed in the control module, and the communication module is configured to enable the control module to communicate with a terminal apparatus.

10. The smart feeder of claim 8, further comprising a sterilization device, wherein the sterilization device is installed in at least one of the food storage chamber or the rotating push plate mechanism; and the sterilization device is configured to sterilize the food.

11. The smart feeder of claim 1, further comprising a rotating laser module, wherein the rotating laser module is configured to generate at least one selected from the group consisting of a rotating beam and a rotating laser pattern.

12. The smart feeder of claim 11, wherein the rotating laser module comprises a third driving mechanism and a laser; the third driving mechanism is installed in a housing, and an output end of the third driving mechanism is connected to the laser; and the laser is configured to generate at least one selected from the group consisting of a beam and a laser pattern.

13. The smart feeder of claim 12, wherein the laser is eccentrically installed on a laser fixing support, and the laser fixing support is connected to the output end of the third driving mechanism.

14. The smart feeder of claim 13, wherein the rotating laser module is located inside the housing, and a light-transmitting plate is disposed on a surface of the housing; and an output of the rotating laser module is aligned with the light-transmitting plate.

15. The smart feeder of claim 11, wherein the rotating laser module is located inside a housing, and a light-transmitting plate is disposed on a surface of the housing; and an output of the rotating laser module is aligned with the light-transmitting plate.

16. The smart feeder of claim 1, further comprising a sterilization device, wherein the sterilization device is installed in at least one of the food storage chamber or the rotating push plate mechanism; and the sterilization device is configured to sterilize the food.

17. A smart feeder, comprising a food storage chamber, a rotating push plate mechanism and a rotating laser module, wherein the food storage chamber is configured to convey a food to the rotating push plate mechanism through a conveying device, the rotating push plate mechanism is configured to rotate and hit the food and the rotating laser module is configured to generate at least one selected from the group consisting of a rotating beam and a rotating laser pattern,
 wherein the rotating laser module is located inside a housing, and a light-transmitting plate is disposed on a surface of the housing; and an output of the rotating laser module is aligned with the light-transmitting plate.

18. A smart feeder, comprising a food storage chamber, a rotating push plate mechanism and a slewing device; wherein the food storage chamber is configured to convey a food to the rotating push plate mechanism through a conveying device, and the rotating push plate mechanism is configured to rotate and hit the food,
 wherein the food storage chamber and the rotating push plate mechanism are installed inside an upper housing, and a bottom of the upper housing is connected to a lower housing through the slewing device.

* * * * *